United States Patent [19]
Church et al.

[11] 3,804,445
[45] Apr. 16, 1974

[54] ANTI-PULL-OUT ENERGY ABSORBING VEHICLE BUMPER MOUNT CONSTRUCTION

[75] Inventors: Herman S. Church, Cuyahoga Falls; James L. Hagener, Canton, both of Ohio

[73] Assignee: Teledyne-Mid-American Corporation, Hartville, Ohio

[22] Filed: Sept. 20, 1972

[21] Appl. No.: 290,484

[52] U.S. Cl. .............................. 293/88, 267/63 A
[51] Int. Cl. ........................................ B60r 19/06
[58] Field of Search ............ 293/88, 85; 267/63 A; 213/8

[56] References Cited
UNITED STATES PATENTS
3,722,939  3/1973  Church et al. .................. 293/88
2,508,347  5/1950  Marsh .............................. 293/85

*Primary Examiner*—Robert G. Sheridan
*Assistant Examiner*—Robert Saifer

[57] ABSTRACT

A vehicle bumper mounting construction formed of a generally elongated box-like housing member enclosing a portion of an elongated beam member generally H-shaped in cross section. A pair of rubber pads having parallel surfaces are bonded one surface to the web of the H-beam member on either side thereof. The other pad surfaces are secured to the side walls of the housing. The housing member is provided with means for mounting the assembly on an automobile, and the H-beam is provided with a mounting flange for attaching the automobile bumper to the assembly. Special interengageable ramp formations are provided on the housing and H-beam with anti-rattle pads therebetween to prevent the beam and rubber pads from being pulled out of the housing when a pull such as a towing force is applied to the bumper. The rubber pads are pre-stressed or pre-loaded to hold the anti-rattle pads under compression in the at-rest or normal position of the mount components. Impact energy applied to the bumper is absorbed by the construction by deflection of the H-beam placing shear stress on the rubber pads.

4 Claims, 7 Drawing Figures

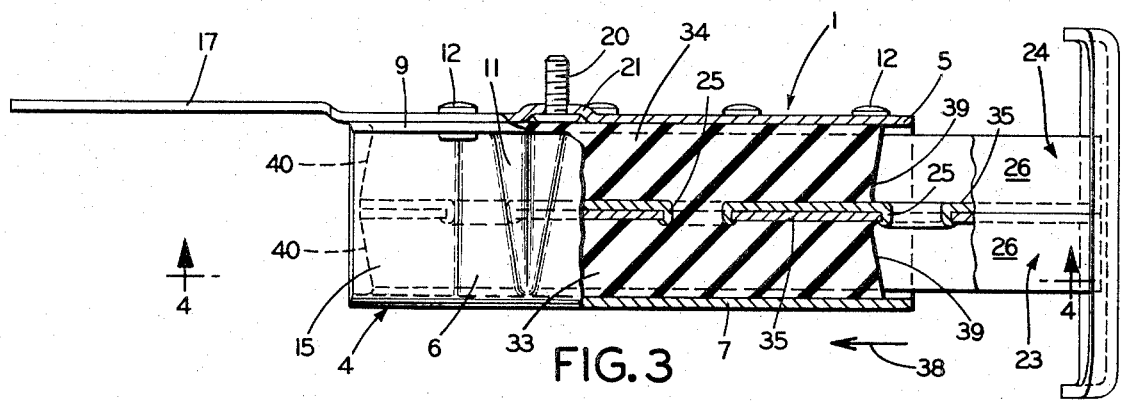
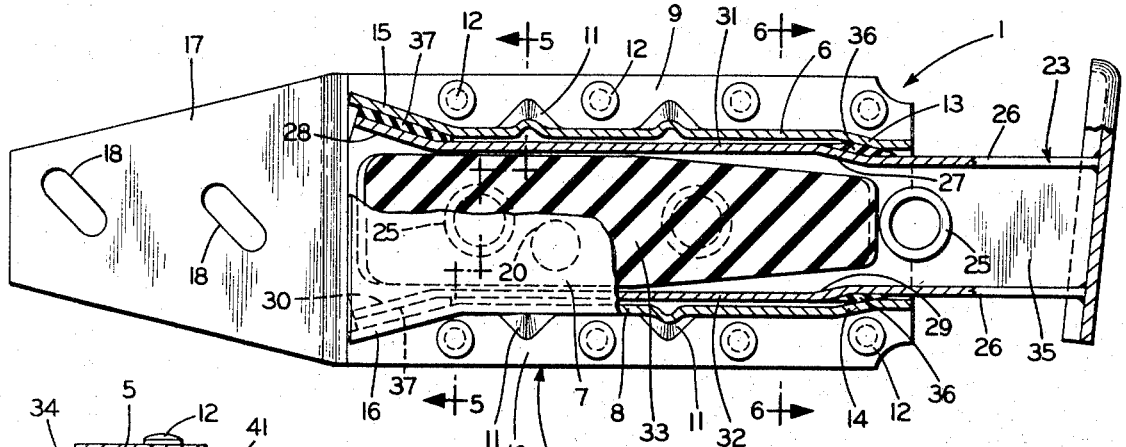
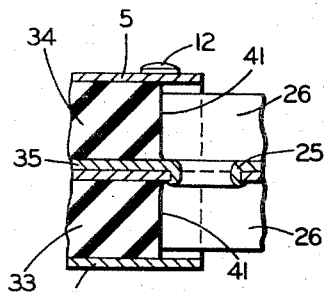
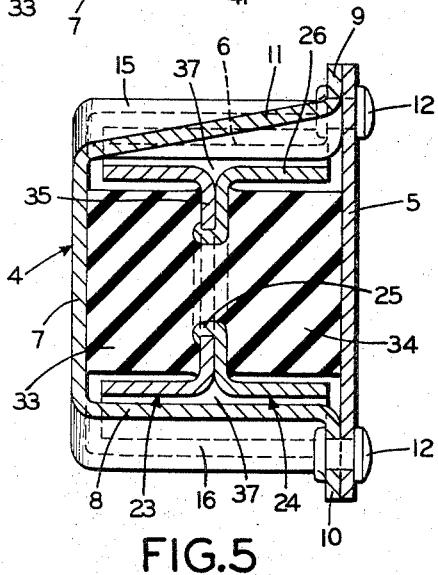
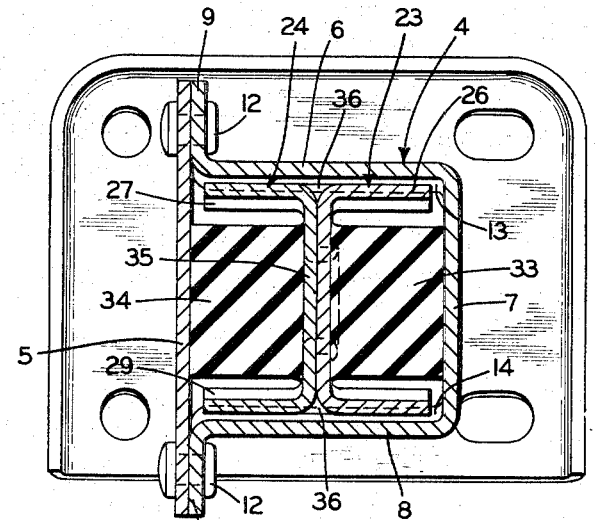

3,804,445

ANTI-PULL-OUT ENERGY ABSORBING VEHICLE BUMPER MOUNT CONSTRUCTION

CROSS REFERENCE TO RELATED APPLICATIONS

The invention involves improvements in the bumper mount construction shown and described in our copending application Ser. No. 201,335, filed Nov. 23, 1971, now U.S. Pat. No. 3,722,939; and the new construction may include a rubber pad and assembly as shown in our copending application, Ser. No. 290,483, filed 9/20/72.

BACKGROUND OF THE INVENTION

Field of the Invention

The invention relates to vehicle bumper mount constructions of the energy absorbing type and particularly the invention relates to an energy absorbing automobile bumper mounting means employing rubber in shear as the energy absorbing member and having special interengageable means preventing pull-out of components of the bumper mounting means when pull such as a towing force is applied to the bumper. In addition, the invention relates to a combined anti-rattle construction activated by the anti-pull-out means and the energy absorbing pads to prevent rattle noises between relatively movable metal components of the bumper mounting means, when the parts are in normal no-load position and no bumping or pulling force is applied to the bumper.

Description of the Prior Art

The constructions shown and described in said copending application Serial No. 201,335 involve bumper mount constructions that absorb, without vehicle damage, impact energy of low velocity vehicle collisions without sacrificing convenience or safety features of an automobile. One form of construction shown in said application Ser. No. 201,335 involves outturned ears on the movable beam which engage the rear end of the housing to transmit a towing load directly from the bumper through the housing to the frame of a vehicle when a towing load is secured to the bumper which pulls the forward end of the beam from the housing until the beam ears engage the rear end of the housing. This construction is undesirable from the standpoint of rattling and because of a concentration of the towing load at small sheet metal edge engagement areas between the edges of ears and the rear end edges of the housing.

Furthermore, the prior construction when towing a load from a rear bumper or when the car itself is towed from its front bumper, may develop side sway oscillation at certain vehicle towing speeds. Similarly, resonant frequency oscillation of the bumper itself may develop during car travel when an otherwise satisfactory prior bumper mount construction is used.

Accordingly, a need has existed for a rugged bumper mount construction having the outstanding, favorable and beneficial characteristics of the constructions shown in said copending application Ser. No. 201,335, while avoiding in bumper mounts, problems that have arisen when towing forces are applied to the bumper, or when the bumper is in at-rest, no-load position. Further, a need exists for an energy absorbing type bumper mount construction which prevents resonant frequency oscillation of the bumper itself from developing during car travel, and which prevents oscillation of bumper connected towing and towed vehicles from developing at certain vehicle speeds.

SUMMARY OF THE INVENTION

Objectives of the invention include providing a vehicle bumper mount construction wherein a towing pull or load may be applied to the bumper and in which generally box-like housing members enclosing a generally H-shaped elongated beam with energy absorbing rubber pads between the housing and beam and with interengageable ramp-like formations at the ends of the housing and the respective adjacent ramp portions of the beam, to prevent pull-out separation of the beam from the housing; providing anti-rattle pads between the interengageable housing and beam ramp-like formations to prevent rattle between the housing and beam; providing a construction avoiding pull-out and having anti-rattle devices in which the energy absorbing rubber pads are pre-stressed or preloaded to hold the anti-rattle pads under compression in the at rest or normal position of the mount components; providing a new bumper mounting construction which prevents undesirable oscillations of the bumper itself or of connected towed and towing vehicles at certain car speeds; providing a construction which combines the described favorable characteristics, which does not sacrifice other convenience or safety features of the vehicle, and which is adaptable for use in a wide variety of models and styles of commercially made automobiles; and providing a construction which is rugged, has simple stamped metal and rubber components, which is easily and economically manufactured without undue cost elements as compared with rigid type mounting constructions, and which satisfies the foregoing objectives.

These objectives and advantages may be obtained by the bumper mounting construction, the general nature of which may be stated as including in bumper mounting means of a type including an elongated housing having top and bottom walls and opposite side walls and open at front and rear ends, an elongated beam of generally H-shaped cross section located within the housing, and having a web portion spaced between the opposite side walls, and top and bottom flanges spaced closely adjacent to the housing top and bottom walls respectively, a front portion of the beam extending outward from the housing interior from the front open end of the housing, the rear end of the beam being located adjacent to the rear open end of the housing, energy absorbing elastic members bonded to opposite surfaces of the web and connected to the housing side walls to hold the beam within the housing; the combination of interengageable anti-pull-out ramp-like formations on front and rear portions of the housing, preferably the front and rear portion of the top and bottom housing walls, and on corresponding portions of the H-beam preferably the top and bottom flanges of the H-beam, the ramp-like formations converging toward the front end of the housing and toward the longitudinal axis of the beam; anti-rattle pad means fixed to one of the complementary ramp portions of adjacent housing and beam ramp formations and held under compression against the other at each location of adjacent ramp formations; and the energy absorbing elastic members being pre-loaded to hold the anti-rattle pads under compression.

BRIEF DESCRIPTION OF THE DRAWINGS

A preferred embodiment of the invention — illustrative of the best mode in which applicants have contemplated applying the principles — is set forth in the following description and shown in the drawings, and is particularly and distinctly pointed out and set forth in the appended claims.

FIG. 3 is a top plan view, with parts broken away of the mount shown in FIG. 2;

FIG. 4 is a vertical sectional view taken on the line 4—4, FIG. 3;

FIG. 5 is a cross-sectional view taken on the line 5—5, FIG. 4;

FIG. 6 is a sectional view looking in the direction of the arrows 6—6, FIG. 4; and FIG. 7 is a fragmentary view of a portion of FIG. 3 showing the relative position of the components before pre-loading the energy absorbing rubber pads when the components are assembled.

Similar numerals refer to similar parts throughout the various figures of the drawings.

DESCRIPTION OF THE PREFERRED EMBODIMENT

Figure 1:
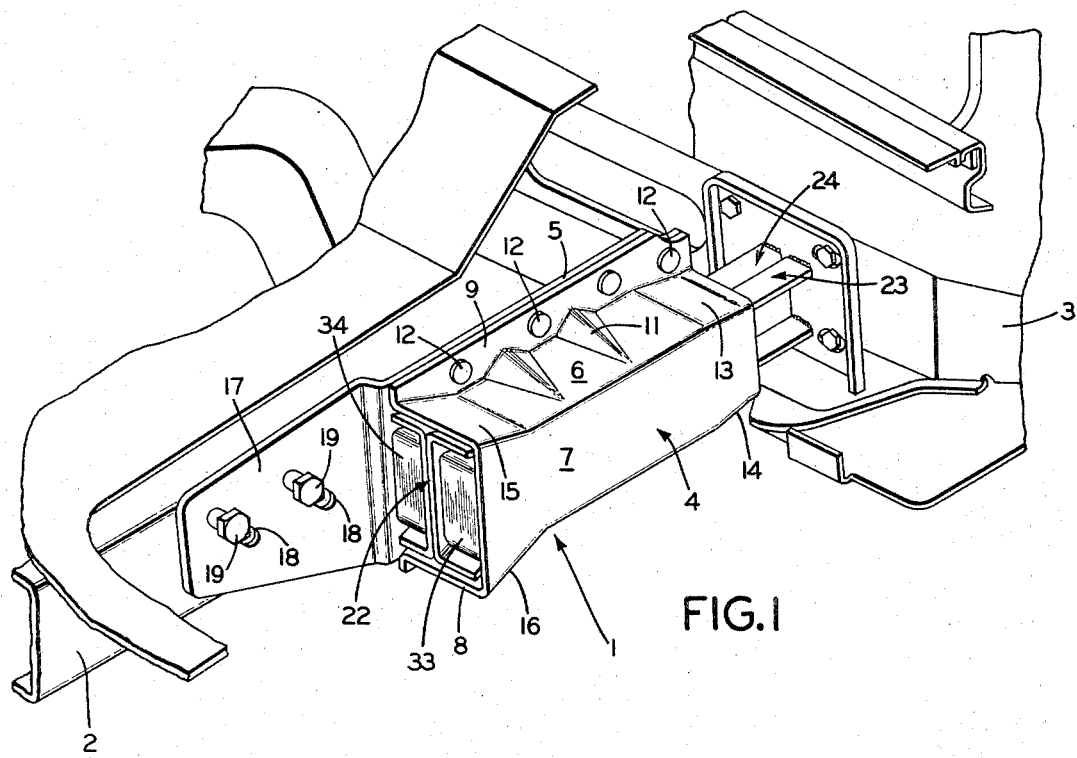
FIG. 1 is a perspective view of the improved bumper mount construction mounted on an automobile frame element and mounting a bumper.

The energy absorbing bumper mount is indicated generally at 1 mounted on a frame member 2 of an automobile and serving as a mount for a bumper 3. The bumper mount 1 includes a box-like housing generally indicated at 4 formed by a mounting plate 5, and a generally channel-shaped flanged member having a top wall 6, a side wall 7, a bottom wall 8 and top and bottom assembly flanges 9 and 10.

Mounting plate 5 forms a side wall opposite side wall 7 of the housing 4, which as stated, is generally rectangular in cross section (FIG. 6). Tapered reinforcing corrugations 11 may be formed in the top and bottom housing walls 6 and 8 to provide stiffness and rigidity to the housing 4. Top and bottom assembly flanges 9 and 10 are riveted at 12 to the housing mounting plate 5.

Figure 2:
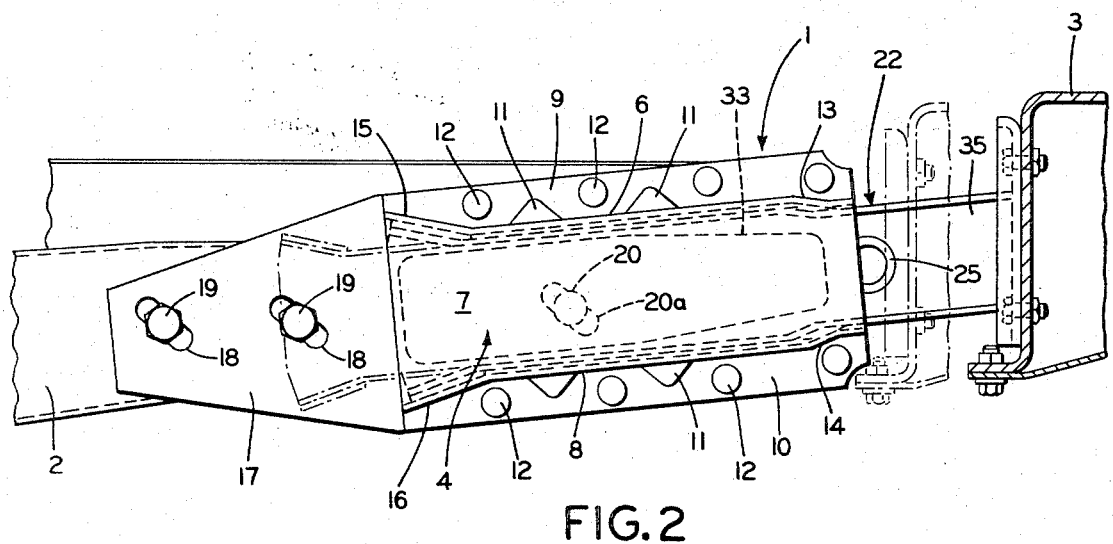
FIG. 2 is a side view of the construction shown in FIG. 1.

Referring to FIGS. 1, 2 and 4, the right hand end portions of the top and bottom housing walls 6 and 8 are formed with ramp formations 13 and 14 converging inwardly toward the right hand or front end of the housing 4 adjacent the bumper 3. The other ends of the housing top and bottom walls 6 and 8, at the left of FIGS. 1, 2 and 4, are formed with cooperating ramp formations 15 and 16 diverging outwardly as shown toward the rear mounting end of the housing 4. Thus, the pairs of ramp formations 13–14 and 15–16 all converge in one direction, to the right or front of the housing 4, viewing FIG. 4, and all diverge in the other direction, toward the rear of housing 4.

The mounting plate 5 may have an offset portion 17 formed with slotted openings 18 engaged by bolts 19 for mounting the bumper mount 1 on the automobile frame member 2. An additional bolt 20, whose head is located in an embossed recess 21 (FIG. 3) in mounting plate 5, also may be engaged through a slotted opening 20a with automobile frame member 2.

The bumper mount 1 also includes a generally H-shaped elongated beam-like member 22 which is composed of two channel members 23 and 24, which may be formed from flat plates of steel or the like. The two channels 23 and 24 preferably are riveted together at several zones indicated at 25, and the web 35 of the assembly extends vertically.

The top and bottom flanges 26 of the H-beam 22 (FIGS. 4, 5 and 6) generally have a configuration in vertical section (FIG. 4) complementary to the configuration of the top and bottom housing walls 6 and 8. The top and bottom beam flanges 26 extend horizontally with respect to the beam web 35, in cross section, at any section, as shown in FIGS. 5 and 6. Thus, the top H-beam flange 26 is formed with a ramp portion 27 matching ramp portion 13 intermediate the beam ends; and at the left hand end of H-beam 22 its top flange 26 is formed with a ramp portion 28 matching the housing ramp portion 15. Similarly, the lower flange 26 of H-beam 22 (FIG. 4) is formed with ramp portions 29 and 30 matching the housing ramp portions 14 and 16.

The flange portions 31 and 32 of H-beam flanges 26 extending between ramp portions 27 and 28, and 29 and 30, respectively, are spaced with clearance from the top and bottom housing walls 6 and 8, as shown in FIGS. 4, 5 and 6, in a manner and for purposes to be described.

A pair of energy absorbing rubber pads or blocks 33 and 34 are bonded to the web 35 of H-beam 22 and to the inner housing surfaces of the housing mounting plate 5 and channel member side wall 7. These rubber pads 33 and 34 may be bonded to the metal beam and housing members during vulcanization of the rubber. In accordance with the invention, the energy absorbing rubber pads 33 and 34 bonded to the web 35 of H-beam 22 may be bonded either during vulcanization or adhesively after vulcanization.

Also, in accordance with the invention, anti-rattle pads 36 and 37 formed of a rubber composition, are applied to or bonded to the outer ramp surfaces 27 and 29, and 28 and 30 of H-beam 22 either during vulcanization or by using an adhesive.

The H-beam 22 with its rubber pads 33 and 34 bonded thereto then is assembled in the housing 4 between mounting plate 5 and the channel shaped member, with an adhesive applied to the outer surfaces of pads 33 and 34 for cold bonding to the inner surfaces of housing 4.

The rubber pads 33 and 34 during final assembly of the bumper mount 1 are pre-stressed or pre-loaded in the direction of the arrow 38, FIG. 3, and the mounting plate 5 and flanges 9 and 10 of housing channel are riveted together at 12 to maintain the pre-load, as shown by the concavity 39 at the right hand ends of pads 33 and 34 in FIG. 3, and the convexity 40 illustrated at the left hand ends of pads 33 and 34.

Such pre-loading holds the anti-rattle pads 36 and 37 compressed between the adjacent ramp portions 13–27, 14–29, 15–28 and 16–30 of the H-beam 22 and top and bottom housing walls 6 and 8. In this manner, the H-beam at-rest, in the no-load position, illustrated in FIGS. 3 and 4 and in full lines in FIG. 2, is held centered with respect to its housing 4 and free of rattling, since the metal components do not and cannot contact one another.

Also, the cooperative relation of the ramps and anti-rattle pads prevent oscillation of a car and trailer hitch, at certain car speeds, when a car and trailer are moving along a highway with a towing connection between car and trailer through a bumper mounted with the improved bumper mount construction 1.

Further, this cooperative relation between ramps and anti-rattle pads prevents resonant frequency oscillations of the bumper itself from developing during car travel when the parts are at-rest, in no-load position. FIG. 2 illustrates in full lines the at-rest, no-load position of the H-beam 22 with respect to the housing 4, and illustrates in dot-dash lines the position of the H-beam with respect to the housing when subjected to impact. When the bumper 3 is subjected to impact, the H-beam 22 moves longitudinally rearwardly within the housing 4, in the direction of the arrow 38, causing distortion of the energy absorbing rubber pads 33 and 34 and placing shear stress on the rubber pads, in a manner fully described in said copending application Ser. No. 201,335.

However, when a vehicle is towed from a towing vehicle through a towing connection with a bumper 3 mounted with the improved bumper mount construction 1 on the front or rear of one of the vehicles, the force or load encountered during towing or at the start of a towing operation, cannot pull the H-beam 22 out of the housing 4 in a direction opposite to that of the arrow 38 in FIG. 3. Such pull-out is prevented by the anti-rattle padded engagement between the housing 4 and H-beam ramps, as illustrated in FIGS. 1, 2 and 4.

The amount of pre-load applied to the assembly as shown in FIG. 3, by the concavities 39 and convexities at the ends of pads 33 and 34, preferably is approximately 5 percent of the total stroke of the H-beam 22, as indicated by the full line and dot-dash line positions of the bumper 3 in FIG. 2.

The pre-loaded anti-pull-out energy absorbing bumper mount construction 1 operates effectively for mounting rear bumpers on a vehicle which is towing another vehicle, or for mounting a front bumper on a vehicle which is being towed.

Furthermore, the improved arrangement maintains the metal beam and housing members in spaced relation so that they cannot jam, and so that rust and corrosion cannot impair the effectiveness of the energy absorbing and anti-pull-out properties of the construction.

The pre-load condition of the assembly also is shown by comparing FIGS. 3 and 7. FIG. 7 shows the relative position of the components without pre-loading. The ends of pads 33 and 34 are illustrated at 41 without the concavity 39 (FIG. 3) which results from pre-loading or pre-stressing the pads 33 and 34. The pre-loading tends to move the beam 22 to the right, viewing FIG. 3, with respect to the housing 4.

As best shown in FIGS. 1 to 4, the web 35 of the H-beam 22 extends in a vertical direction and the flanges 26 of the H-beam 22 extend horizontally at any section with respect to the web at any location along the flange and ramps, even though the bumper mount 1 is mounted on an automobile frame member 2 slanted slightly upwardly from the rear of housing 4 to the front thereof (from left to right, FIG. 2).

Further, the interengageable ramps on the H-beam 22 and housing 4 converge toward the front of the housing 4 so as to prevent the end of the H-beam 22 which projects from the front of the housing 4 from being pulled out of the front of the housing. The end projection of the H-beam 22 is provided to permit movement of the H-beam rearwardly in the housing for the full stroke shown in dot-dash lines in FIG. 2, when the bumper is involved in a collision and when the rubber pads 33 and 34 absorb the energy by movement of the H-beam 22 into the housing toward the rear thereof.

The generally rectangular outer shape of the H-beam 22 in cross section, as well as the rectangular cross-sectional shape of the housing 4 in which the H-beam is telescoped, prevent relative rotation of the H-beam 22 with respect to the housing 4 along the longitudinal axis of the H-beam 22. Furthermore, the horizontal disposition of the top and bottom walls 6 and 8 of the housing 4 and of the flanges 26 of the H-beam 22 enable vertical loads to which the bumper may be subjected to be transmitted directly from the H-beam flanges to the top and bottom walls 6 and 8 of the housing 4, thus permitting bumper jacks to be used to lift and sustain the weight of a car having bumpers mounted with the improved bumper mount construction. Thus the new construction retains the advantageous features of the energy absorbing bumper mount construction of said copending application Ser. No. 201,335.

The pre-loading of the assembled components of the improved bumper mount preferably is approximately 5 percent of the total stroke of the H-beam. The amount of pre-loading, however, may vary between say, 2 to 10 percent, depending upon the particular bumper, type of vehicle, etc., involved. The important consideration of this aspect of the invention is that a pre-load is established between the energy absorbing rubber pads 33 and 34, the H-beam 22 and the housing 4 so that the anti-rattle pads 36 and 37 between the H-beam 22 and housing 4 are maintained under compression sufficient to avoid any rattling contact between metal components of the mount assembly under any no-load conditions of the bumper and mount.

Accordingly, the present invention provides a bumper mount construction which prevents pull-out separation of components of the mount incident to subjecting a bumper mounted on the improved construction to a pulling force, as when towing a vehicle connected with a bumper so mounted; provides a bumper mount construction satisfying the described anti-pull-out requirement with anti-rattle means cooperatively associated with the anti-pull-out and the energy absorbing constructions; provides a construction in which the energy absorbing means are pre-loaded to establish the anti-rattle characteristics in the at-rest or normal position of the mount components; provides a construction which prevents undesirable oscillatory movement of the bumper itself, or of connected towed and towing vehicles at certain car speeds; provides a construction which enables convenience and safety features for the vehicle to be retained for energy absorbing bumper mounts which may be used in a wide variety of models and styles of commercial automobiles; provides a construction which is rugged and which has simple stamped metal and rubber components and which is easily and economically manufactured; and provides a construction satisfying the described objectives, achieving new results and solving problems and satisfying needs which have existed in the art.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and is not limited to the exact details of the construction shown or described.

Having now described the features, discoveries and principles of the invention, the manner in which the improved bumper mount construction may be made, the characteristics of the new construction, and the advantageous, new and useful results obtained; the new and useful structures, devices, elements, arrangements, parts and combinations are set forth in the appended claims.

We claim:

1. In vehicle energy absorbing bumper mount construction of a type including an elongated housing having top and bottom walls and opposite side walls and open at front and rear ends, an elongated beam of generally H-shaped cross section located within the housing, and having a web portion spaced between the opposite side walls, and top and bottom flanges spaced closely adjacent to the housing top and bottom walls respectively, a front portion of the H-beam extending outward from the housing interior from the front open end of the housing, the rear end of the H-beam being located adjacent to the rear open end of the housing, energy absorbing elastic members bonded to opposite surfaces of the web and connected to the housing side walls to hold the H-beam within the housing; the combination of interengageable anti-pull-out formations on the front and rear end portions of the housing and on corresponding portions of the H-beam converging toward the front end of the H-beam and its longitudinal axis, preventing the H-beam from being pulled out of the front end of the housing; and anti-rattle pads held under compression between the interengageable anti-pull-out formations on the housing and H-beam.

2. In vehicle energy absorbing bumper mount construction of a type including an elongated housing having top and bottom walls and opposite side walls and open at front and rear ends, an elongated beam of generally H-shaped cross section located within the housing, and having a web portion spaced between the opposite side walls, and top and bottom flanges spaced closely adjacent to the housing top and bottom walls respectively, a front portion of the H-beam extending outward from the housing interior from the front open end of the housing, the rear end of the H-beam being located adjacent to the rear open end of the housing, energy absorbing elastic members bonded to opposite surfaces of the web and connected to the housing side walls to hold the H-beam within the housing; the combination of interengageable anti-pull-out formations on the front and rear end portions of the housing and on corresponding portions of the H-beam converging toward the front end of the H-beam and its longitudinal axis, preventing the H-beam from being pulled out of the front end of the housing; the anti-pull-out formations being ramp-like in shape and formed at the front and rear end portions of the top and bottom walls of the housing, and also formed in corresponding portions of the top and bottom flanges of the H-beam; an anti-rattle pad bonded to each ramp-like formation on the H-beam top and bottom flanges; and the anti-rattle pads being held compressed against the adjacent ramp-like formations on the housing top and bottom walls.

3. The construction defined in claim 1 in which the elastic members are pre-loaded to hold the anti-rattle pads under compression.

4. The construction defined in claim 2 in which the elastic members are pre-loaded to hold the anti-rattle pads under compression.

* * * * *